United States Patent [19]

Lee

[11] 4,144,298
[45] Mar. 13, 1979

[54] METHOD OF FORMING STRAIN CRYSTALLIZED THERMOPLASTIC ARTICLES

[75] Inventor: Soo-Il Lee, Toledo, Ohio

[73] Assignee: Owens-Illinois, Inc., Toledo, Ohio

[21] Appl. No.: 821,943

[22] Filed: Aug. 4, 1977

[51] Int. Cl.² .............................................. B29C 17/07
[52] U.S. Cl. .................................... 264/532; 264/535; 425/526; 425/529; 425/530
[58] Field of Search ...................... 264/89, 94, 96–99, 264/95, 289, 290 T, 291, 210 R; 425/526, 529, 530; 215/1 C

[56] References Cited

U.S. PATENT DOCUMENTS

| | | | |
|---|---|---|---|
| 3,733,309 | 5/1973 | Wyeth et al. | 264/98 X |
| 4,002,709 | 1/1977 | Mozer | 264/99 X |
| 4,042,657 | 8/1977 | Ostapchenko et al. | 264/97 X |

FOREIGN PATENT DOCUMENTS

| | | | |
|---|---|---|---|
| 668578 | 8/1963 | Canada | 264/289 |
| 983300 | 2/1965 | United Kingdom | 264/289 |

Primary Examiner—Jan H. Silbaugh
Attorney, Agent, or Firm—R. D. Heberling; D. H. Wilson; M. E. Click

[57] ABSTRACT

A method is disclosed for conditioning strain hardenable thermoplastic materials, such as polyethylene terephthalate, so that a highly developed strain crystallized morphology may be established during a blow molding operation. In the method, a thermoplastic parison is heated to a temperature in a range conducive to molecular orientation and then initially stretched at that temperature. Next, the stretched parison is cooled to a temperature slightly below glass transition temperature and stretched further at the reduced temperature. The combined stretching in these two separate phases is chosen to condition the material so that it is either on the verge of being strained hardened or has actually started strain hardening. Thereafter, the parison may be again heated to a temperature conducive to molecular orientation and blown; to a final article, with the resulting expansion of the material during the blowing operation achieving the desired strain crystallized morphology and strain hardening.

18 Claims, 15 Drawing Figures

METHOD OF FORMING STRAIN CRYSTALLIZED THERMOPLASTIC ARTICLES

BACKGROUND OF THE INVENTION

1. Field of the Invention

The present invention relates generally to a method for forming a thermoplastic article having a highly developed strain crystallized morphology. More particularly, one phase of the method involves stretching the thermoplastic article at a temperature below its glass transition temperature prior to a final forming operation, such as blow molding.

2. The Prior Art

The prior methods of forming thermoplastic articles in blow molding operations have typically involved either (1) heating a parison to a molecularly orientable temperature and then blowing the parison, (2) heating a parison to a molecularly orientable temperature, axially stretching the parison, and then blowing the stretched parison, or (3) blowing a parison to the configuration of a pre-form and then blowing the pre-form to the final article. These methods, as applied to crystallizable thermoplastic materials, have yielded blown containers where the material has been crystallized on the order of only about 10 to 12% generally. Since the degree of crystallinity affects several property characteristics, such as permeability, creep resistance, tensile strength, etc., it is desirable to enhance the degree of crystallinity without significantly extending cycle times in a blow molding operation.

Thus, one primary object of the present invention is to form a blown product which has improved property characteristics over those products formed by the currently recognized forming techniques.

SUMMARY OF THE INVENTION

The present invention relates primarily to a method of preconditioning a strain crystallizable, molecularly orientable thermoplastic material prior to a final forming operation, so that the material is susceptible to strain hardening and to the formation of a highly developed strain crystallized structure during the final forming operation. As applied to a blow molding operation, the method includes, first, thermally conditioning a parison to a temperature which is in a range conducive to molecular orientation. While the material is in this temperature range, the parison is stretched to initiate molecular orientation. Thereafter, the parison is cooled to a temperature below the glass transition temperature for the material and then stretched at the reduced temperature, whereupon the molecular structure of the material is extended without the development of significant crystallization.

After the pre-conditioning steps, the parison may then be heated to a temperature in the range conducive to molecular orientation and blown at that temperature within a blow mold cavity to form a final article. During the blowing operation, the material experiences strain hardening and strain crystallization as a result of the pre-conditioning steps, with the degree of crystallinity being enhanced in comparison with other typical blow molding methods.

When using polyethylene terephthalate material, the parison is initially heated to a temperature in the range of from 75° C. to about 110° C. and stretched to achieve an areal strain of from about 2.0 to about 2.75. Then the material is cooled to a temperature in the range of from about 60° C. to about 75° C. and further stretched to achieve a total areal strain of from about 2.4 to about 3.0. To prepare the material for the blow molding operation, the parison is reheated to a temperature in the range of from about 75° C. to about 120° C., while applying axial tension to prevent shrinkage. Then the parison is blown within the blow mold cavity to develop the strain hardening and strain crystallization.

In one aspect of the invention, the parison is axially stretched and then cooled to a temperature below glass transition temperature, whereupon only certain portions of the parison are expanded at the reduced temperature to localize the improved material characteristics, such as in heel and bottom portions of a container.

In another aspect of the invention, the finally blown product may be heat treated at elevated temperatures for a relatively short period of time to further develop the crystallinity. Alternatively, the blown article may be heat treated at a significantly reduced temperature in the range of from about 50° C. to about 70° C. over extended periods of time, such as on the order of one to two hours. The reduced-temperature heat treating process may be used instead of the elevated temperature heat treated process because a greater degree of crystallinity is generated during the blow molding operation, with the low-temperature heat setting being used to enhance dimensional stability to the material.

As a result of the present invention, several advantageous property characteristics may be achieved in the final product. For example, a highly developed strain crystallized morphology may be achieved to render better physical properties, such as improved creep resistance, reduced permeability, and improved ductility and yield strengths. Because the present invention develops strain crystallized morphology, as opposed to a spherulitic crystallinity, the final articles will also have good clarity. Additionally, the article may be highly uniform in thickness, with reduced shrinkage.

Several other advantages follow from the present invention. For example, the invention enables the formation of thinner, lighter weight bottles having equivalent property characteristics of prior thicker bottles. Thermoplastic materials having a lower inherent viscosity may also be used, without sacrifices in property characteristics which have previously been associated with materials having a higher inherent viscosity. The present method is also adaptable to mass production and reduces the sensitivity on the ranges for strain rates and temperatures to provide a commercially feasible operation.

These and other meritorious features will be more fully appreciated from the following detailed description and the appended claims.

DETAILED DESCRIPTION OF THE PREFERRED EMBODIMENTS

The present invention is primarily suited for processing strain crystallizable, strain hardenable, molecularly orientable thermoplastic materials, particularly polyethylene terephthalate, for the purpose of developing a highly defined strain crystallized morphology in the finally formed products. The following disclosure is directed primarily to a blow molding operation; but the invention is not necessarily limited to that process, since the method could also be applied to bi-directional stretching of polyethylene terephthalate sheet material.

Figure 1:
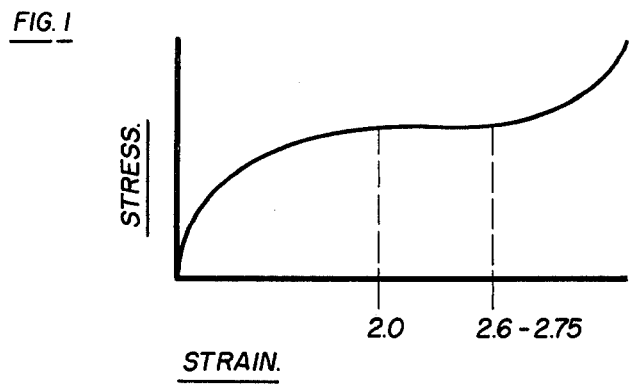
FIG. 1 depicts a stress-strain curve for polyethylene terephthalate when processed to establish strain hardening.
Figure 2:
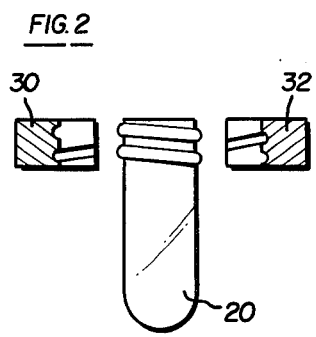
FIGS. 2–10 schematically illustrate the steps of forming a blown container according to the present invention.

FIG. 1 illustrates a stress-strain curve for polyethylene terephthalate which experiences a strain hardening phenomena at a constant temperature. As illustrated, the stress applied to the polyethylene terephthalate initially increases until the yield stress of the material is reached. After that point, the stress plateaus during further strain of the material until strain hardening is initiated, where the stress again increases for further strain. The point of strain hardening generally occurs in polyethylene terephthalate material for total areal strains of about 2.6 to 2.75, respectively for materials of 0.9 inherent viscosity (i.v.) and 0.6 i.v. To establish strain hardening, the material must be thermally conditioned within certain temperature ranges, preferably at a temperature conducive to molecular orientation. Additionally, the material must be stretched at a rate sufficient to induce the strain hardening, for example at a rate of 100% per second when the material is at a temperature within a range conducive to molecular orientation. As will become apparent from the following disclosure, the stretch rate for inducing strain hardening may be reduced to a rate in the range of from about 10% per second to about 100% per second when the material is at a temperature below glass transition temperature in accordance with the present invention.

Figure 3:
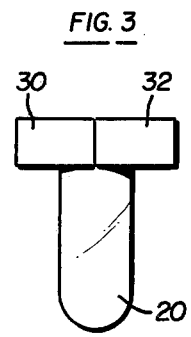
Figure 4:
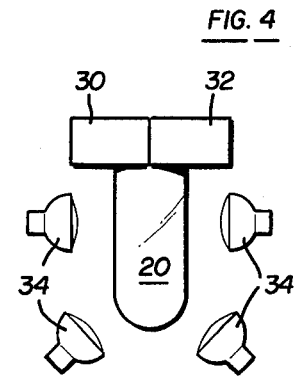

Referring now more particularly to FIGS. 2–10, the method of the present invention is initiated by positioning an essentially amorphous parison 20 of a suitable thermoplastic material, such as polyethylene terephthalate, between a pair of radially movable neck ring carriers 30 and 32. As illustrated by FIGS. 3 and 4, the neck ring carriers are closed upon the neck of the parison and then displaced to a thermal conditioning region where suitable heaters 34, preferably infrared heaters, bring the temperature of the parison to within a range conducive to molecular orientation. For polyethylene terephthalate, the temperature should be raised to within the range of from about 75° C. to about 110° C., depending upon the inherent viscosity of the material, with lower inherent viscosities generally requiring lower temperatures within the specified range.

Figure 5:
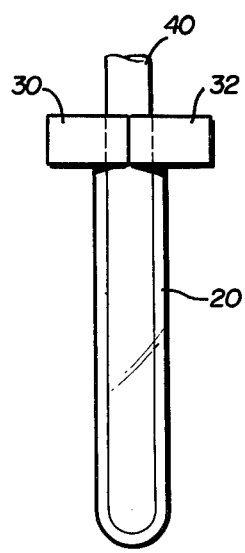

Next, the neck rings are displaced to axially align the thermally conditioned parison with an axially displaceable stretch rod 40. As illustrated in FIG. 5, the stretch rod 40 is inserted into the top opening of the parison and is inserted within the parison to effect an axial parison elongation. Due to the temperature of the material, the axial elongation initiates molecular orientation of the material and provides the initial desired conditioning of the material for establishing strain crystallization and strain hardening. Preferably, the stretch rate during this step will be on the order of about 100% per second, such that a parison which is initially three inches long, for example, will have a length of six inches after one second of stretching.

This initial stretch at the prescribed temperature is desirable for two reasons. First, by initially stretching the material at a temperature above the glass transition point, the possibility of necking in the parison is reduced. Second, the parison is stretched beyond the yield stress of the material into the region of stress plateau, as shown in FIG. 1, in order to prepare the material for subsequent strain hardening. For polyethylene terephthalate, the extent of stretch is preferably in the range of from about 2.0 to about 2.6–2.75, the upper limit being that point at about which strain hardening is initiated.

Figure 6:
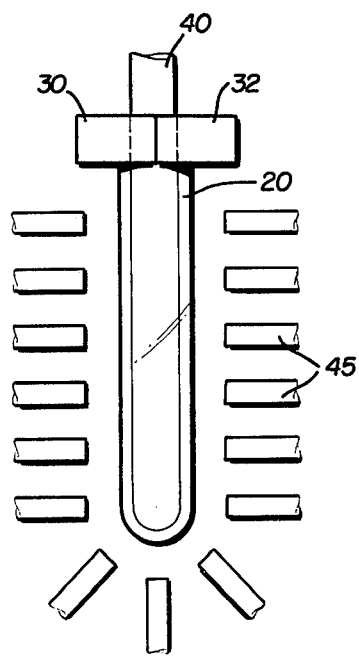

After the initial stretching operation, pressure is preferably maintained on the stretch rod 40 to apply tension to the parison 20 to eliminate shrinkage as the material is cooled to a reduced temperature below the glass transition point. For polyethylene terephthalate, the parison is preferably cooled to a temperature in the range of from about 60° C. to about 75° C. This cooling operation may be achieved in a variety of ways, such as schematically illustrated in FIG. 6 where the parison is conveyed through a cooling region which includes a plurality of cool air nozzles 45.

Figure 7:
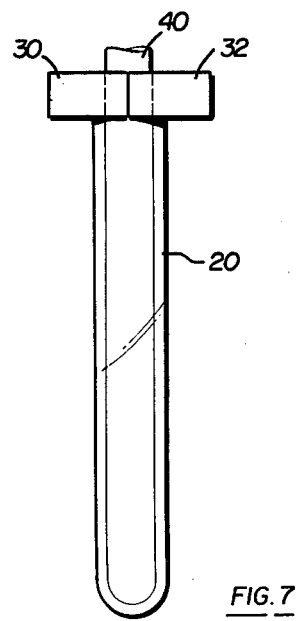

Then the parison is again stretched, as shown by FIG. 7, while the material is at a temperature below its glass transition point. The extent of stretch in this operation should preferably be at least sufficient to condition the material where it is on the threshold of becoming strain hardened. Alternatively, the material may be stretched into the strain hardening region, but should not be stretched to the point where cloudiness appears in the parison as a result of stress crazing. For polyethylene terephthalate, the desired extent of stretch effected in this operation is to within the range of from about 2.5 to about 3.0, total strain.

By stretching the material at the reduced temperature below glass transition point, strained-induced crystallization is suppressed while the molecules in the material are extended. This has been found to achieve an increased crystallization in the thermoplastic material after a subsequent forming operation, with the increased crystallization being of the strain-crystallized type as opposed to a temperature-induced spherulitic type. The strain-crystallized morphology which results from the present invention yields several improved property characteristics which have been more fully discussed in prior portions of the disclosure. As previously disclosed, the stretch rate during the second stretching operation may be in the range of from about 10% per second to about 100% per second, as desired. Lower stretch rates may be preferred to eliminate the occurrence of stress crazing which might occur at higher stretch rates since the material is at a reduced temperature.

Once the parison has been stretched at the temperature below glass transition point, the parison may be cooled and stored for a subsequent blow molding operation. If the parison is cooled at this point, pressure should preferably be applied to the parison by stretch rod 40 to minimize shrinkage.

Figure 8:
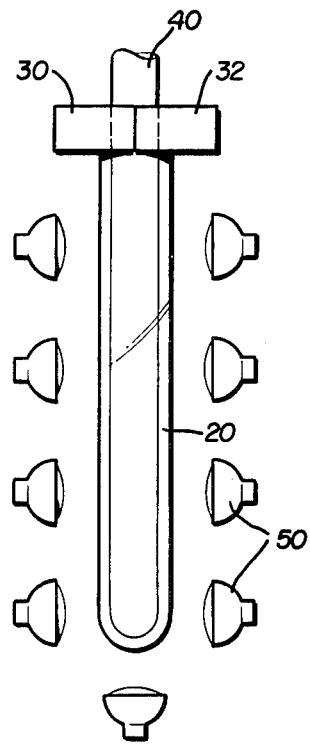

Alternatively, the parison may be immediately reheated for a following blow molding operation. This reheating may be achieved as shown in FIG. 8 by conveying the neck rings to a heater region which includes a plurality of radiant heaters 50. Preferably, pressure is applied to the stretched parison 20 by the stretch rod 40 during the reheating operation to eliminate shrinkage. During the reheating step, the material of the parison is preferably brought to a temperature in the range to molecular orientation. For polyethylene terephthalate, the temperature may be within the range of from about 75° C. to about 120° C., the upper limit being greater than that for the initial stretching step because it may be desirable to induce crystallization in the material during the reheating and blow molding step.

Figure 9:
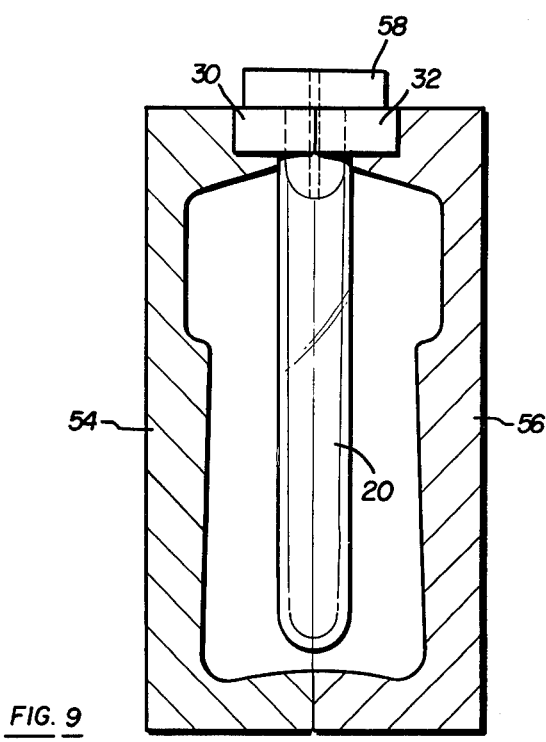
Figure 10:
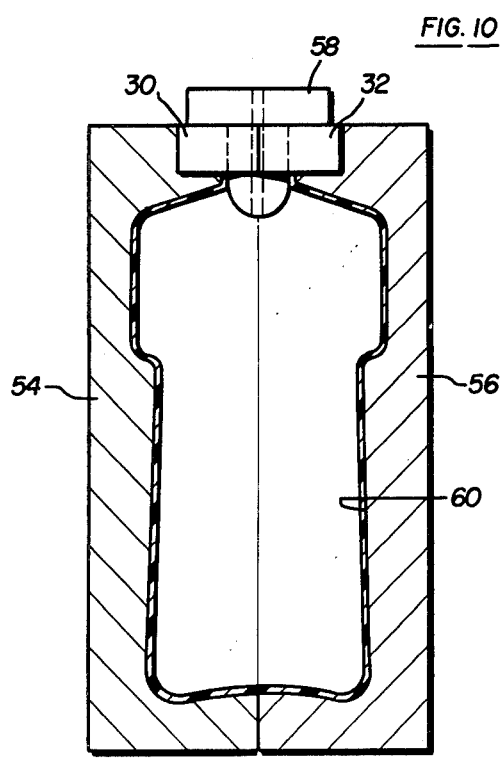

Following the reheating step, the stretch rod may be retracted from the parison, which is then conveyed by the neck ring supports to a position for enclosure within a blow mold cavity defined by blow mold sections 54 and 56. Alternatively, the stretch rod 40 may include suitable air ports to provide a blowing pressure for expanding the parison. As illustrated in FIGS. 9 and 10, however, a separate blow pin 58 is inserted within the open end of the parison, with air under pressure being supplied to the blow pin from a suitable source (not shown) as is conventional. By the application of blow fluid under pressure, the axially elongated parison 20 is expanded to the final article 60, as shown in FIG. 10. As will be appreciated, the blow fluid should be at a pressure sufficient to expand the thermoplastic material at a rate necessary for strain hardening the material. Most preferably, the blow fluid is at a pressure of from between about 300 to about 500 psi prior to any adiabatic expansion. Alternatively, the blow pressures may be applied in other manners as desired, such as by initially applying a pressure of from about 100 to about 300 psi and then increasing the pressure to within the range of from about 300 to 500 psi before the material reaches the sidewalls of the mold cavity.

After the blow molding operation, the blown article 60 may be cooled internally of the mold, then removed from the mold as a final product.

Figure 11:
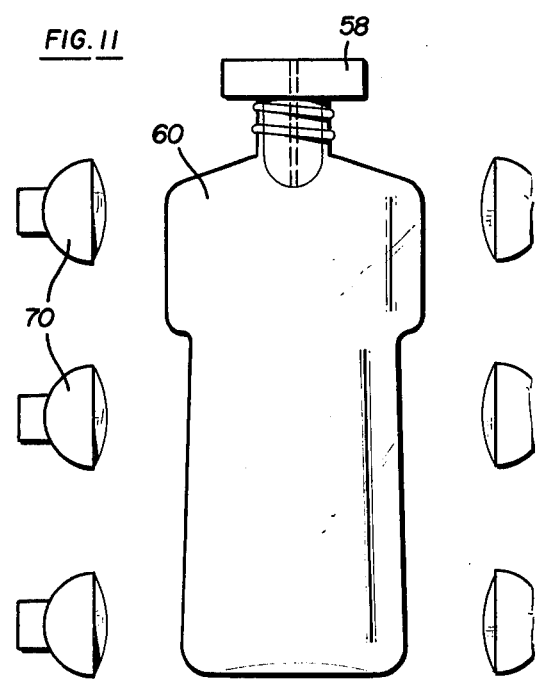
FIG. 11 schematically illustrates an additional optional step of heat treating the final container subsequent to a blow molding operation.

In another aspect of the invention, the blown article 60 may be heat treated by conveying the article on the blow pin 58 to a thermal conditioning region which includes a plurality of heaters 70, as illustrated in FIG. 11. This heat treating operation may be performed in a variety of ways. For example, the material may be subjected to a relatively high temperature of about 180° C. where maximum crystallization occurs for polyethylene terephthalate. For these temperatures, the material may be heat treated for a relatively short period of time, such as on the order of from about 10 seconds to about 30 seconds to induce further crystallization.

Alternatively, the blown article 60 may be heat treated at a significantly lower temperature as a result of the morphology developed in the material by the proces of the present invention. Specifically, the blown article 60 may be heat treated at a temperature of from between about 50° C. and about 70° C. for extended periods on the order of one to two hours for the purpose of establishing dimensional stability. The greater temperatures are not necessary to induce further crystallinity because the method of the present invention develops a greater degree of crystallinity over prior methods.

In another aspect of the present invention, only localized portions of a stretched parison may be stretched at the reduced temperature for the purpose of localizing improved property characteristics. Such an operation is shown in FIGS. 12-15.

Figure 12:
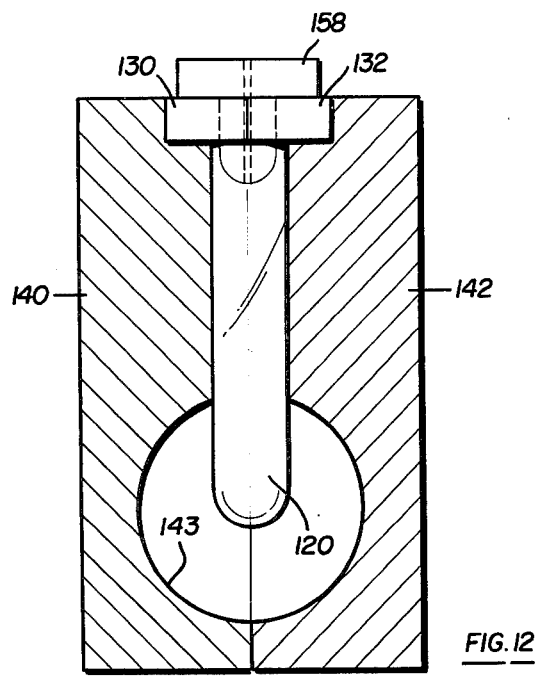
FIGS. 12–15 schematically illustrate a method for enhancing the crystallization in the heel and bottom portions of a bottle in accordance with the present invention.
Figure 13:
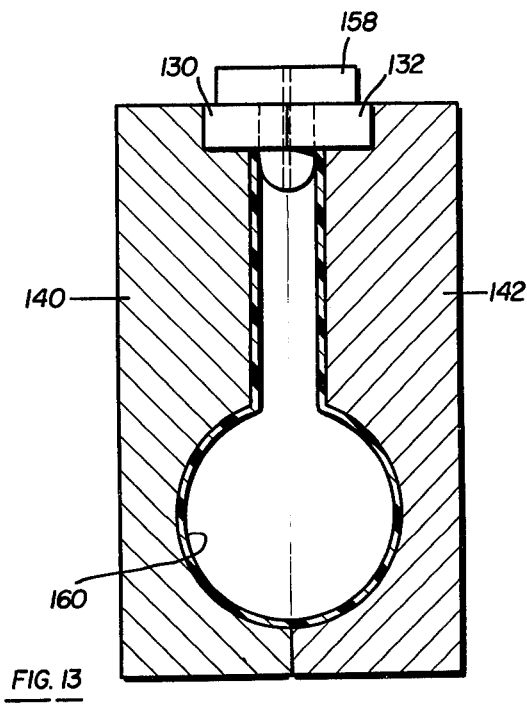

In this aspect, a parison 120 is heated in accordance with the disclosure associated with FIG. 4 and then initially stretched and cooled in accordance with FIGS. 5 and 6. Thereafter, the parison may be placed within an intermediate blow mold formed by mold sections 140 and 142, as shown in FIGS. 12 and 13. These old sections cooperatively define a blow and mold cavity 143 for accommodating the expansion of the lower portion of the parison while at a temperature in the range of from about 60° C. to about 75° C. in order to enhance the physical properties in the heel and bottom regions of the finally blown product.

In the process, the stretched, cooled parison 120 is conveyed by neck ring supports 130 and 132 to a region between blow and mold sections 140 and 142. Then, the mold sections are closed around the parison and a blow nozzle 158 is inserted into the open end of the parison. Thereafter, blow fluid is injected into the interior of the parison from a source (not shown), resulting in expansion of the lower portion of the parison 120 to form the intermediate product 160 as shown in FIG. 13.

Figure 14:
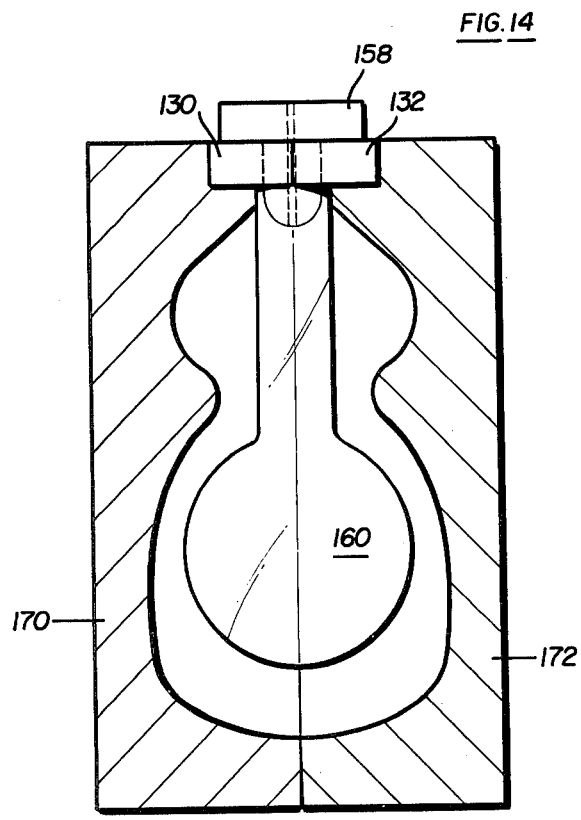
Figure 15:
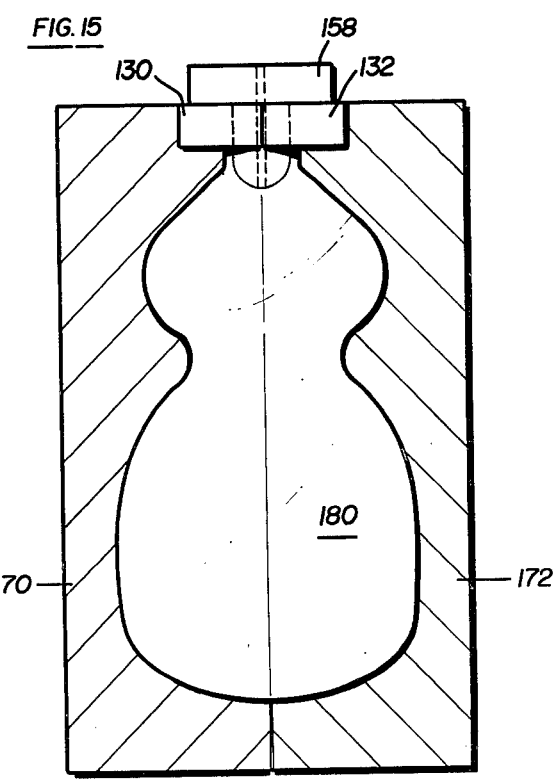

Thereafter, the intermediate product 160 should be heated in accordance with the disclosure of FIG. 8 and then transported to a final blow mold. Such a final blow mold is illustrated in FIGS. 14 and 15 as including blow mold sections 170 and 172. As shown in FIG. 14, the intermediate product 160 is initially positioned within the mold cavity and then blown by the introduction of blow fluid under pressure through blow nozzle 158 as shown in FIG. 15. The resulting final product 180 may then be cooled or heat treated in accordance with the disclosure associated with FIG. 11. As a result of this method, the heel and bottom portions of the final article will be strengthened by the increased crystallization.

It will be understood that the foregoing disclosure has been exemplary in nature, rather than limiting, since various modifications may be made to the overall disclosed process. For example, various blow pressures and axial extension ratios may be utilized with strain-crystallizable thermoplastic materials other than polyethylene terephthlate.

Accordingly, having therefore fully and completely disclosed my invention, I now claim:

1. In a method of pre-conditioning a tubular parison of polyethylene terephthalate material preparatory to a blow molding operation so that a highly-developed strain crystallized morphology may be developed in the material during a blow molding operation, the method comprising the steps of:
    (a) thermally conditioning the tubular parison to a temperature conducive to molecular orientation in the range of from about 75° C. to about 110° C.;
    (b) stretching the parison while in said temperature range to achieve an areal strain in the material of from about 2.0 to about 2.75;
    (c) cooling the stretched parison to a temperature at or below the glass transition temperature for the material in the range of from about 60° C. to about 75° C.;
    (d) further stretching the cooled parison to achieve an areal strain in the material of from about 2.4 to about 3.0;
    (e) heating the parison to a temperature in a range conducive to molecular orientation; and
    (f) expanding the parison within a blow mold cavity to form a final blown article.

2. The method as defined in claim 1, wherein Steps (b) and (d) are effected by axially elongating the parison.

3. The method as defined in claim 1, wherein Step (b) is characterized by expanding the material to achieve an areal strain of from about 2.6 to about 2.75 so that the material is on the verge of experiencing strain hardening, and wherein Step (d) is characterized by expanding the material into the strain hardening range of the material.

4. The method as defined in claim 1, wherein Step (b) is characterized by expanding the material to achieve an areal strain of about 2.0, and wherein Step (d) is characterized by further expanding the material to achieve an areal strain of from about 2.6 to about 2.75 such that the material is on the verge of experiencing strain hardening.

5. The method as defined in claim 4, characterized by maintaining pressure on the parison during the performance of Step (c) to prevent shrinkage.

6. The method as defined in claim 2, further including the Steps of (e) heating the stretched parison subsequent to the performance of Step (d) to a temperature in the range of from about 75° C. to about 120° C. while applying axial tension to the parison to prevent shrinkage, and then (f) expanding the parison while in said temperature range within a blow mold cavity to form a blown article.

7. The method as defined in claim 6, further including the step of heat treating the blown article outside the blow mold for an extending period of time at a temperature of between about 50° C. and about 70° C.

8. The method as defined in claim 6, further including the step of heat treating the blown article for a relatively short period of time at a temperature of between about 120° C. and about 200° C.

9. In a method of blow molding a container of strain crystallizable, strain hardenable, molecularly orientable, thermoplastic polyethylene terephthalate material, the steps of:
 (1) thermally conditioning an essentially tubular parison of said thermoplastic material to a temperature in a range conducive to molecular orientation;
 (2) axially stretching the parison while within said temperature range to establish uniaxial orientation in the thermoplastic material, the extent of stretch being less than that necessary to establish strain hardening in the material for the given stretch rate and given temperature of the material;
 (3) cooling the stretched parison to a temperature equal to or below glass transition temperature while resisting shrinkage of the material by applying axial tension to the parison;
 (4) axially stretching the parison while at a temperature within the range of from glass transition temperature to about 15° C. below glass transition temperature, the extent of stretch being at least sufficient to condition the material for the substantially immediate onset of strain hardening in a subsequent blow molding operation and at least slightly less than to establish strain hardening to such an extent that strain crazing is developed in the material; then
 (5) heating the stretched parison to a temperature within a range conducive to molecular orientation, while applying tension to the parison to resist shrinkage; and
 (6) blowing the parison inside a blow mold while at a temperature conducive to molecular orientation to establish a highly developed strain crystallized morphology.

10. In a method of conditioning the material in a parison of polyethylene terephthalate prior to heating the parison to a temperature conducive to molecular orientation of the material and expanding the parison in a blow mold cavity to provide a final article, the improvement in the conditioning comprising the steps of:
 (1) heating the polyethylene terephthalate parison to a temperature in the range of from about 75° C. to about 110° C. so that the material is susceptible to molecular orientation;
 (2) axially stretching the parison while in said temperature range to a length of at least about twice the initial parison length to initiate molecular orientation in the material;
 (3) cooling the stretched parison to a temperature of between about 60° C. and the glass transition temperature of the material, while applying axial tension to the parison; and
 (4) further stretching the parison while in the temperature range achieved by the performance of Step (3), such that the material in the parison is at least about on the verge of being strain hardened.

11. The method as defined in claim 10, characterized in Step (4) by stretching the parison sufficiently to initiate strain hardening in the material.

12. A method of improving the property characteristics in the heel and bottom portions of a blown container of a molecularly orientable thermoplastic polyethylene terephthalate material, comprising the steps of:
 axially stretching a parison of said thermoplastic material while at a temperature conducive to molecular orientation to achieve an areal strain of about 2.0 to about 2.75;
 cooling the stretched parison to a temperature at or slightly below the glass transition temperature for the material;
 expanding to achieve an areal strain of about 2.4 to about 3.0 essentially only those portions of the parison which are destined to form the heel and bottom portions of the container while those portions are at a temperature equal to or less than the glass transition temperature for the material;
 heating the parison to a temperature conducive to molecular orientation; and then
 expanding the parison internally of a blow mold to form a final container having bottom and heel portions formed from the material which was expanded at a temperature equal to or less than glass transition temperature.

13. In a method of conditioning an essentially tubular parison of a strain crystallizable, molecularly orientable, strain hardenable thermoplastic material prior to heating the parison to a temperature conducive to molecular orientation and expanding the parison in a blow mold cavity to provide a final blown article, the stress-strain relationship of the material at appropriate temperatures and stretch rates being such that the stress increases during initial strain of the material, then the stress plateaus during the immediately following strain, and then the stress increases again after the plateau to indicate strain hardening of the material; the improvement in the conditioning comprising the steps of:
 (a) stretching said parison while at a temperature in a range conducive to molecular orientation, the extent of stretch being sufficient to subject the material to a stress-strain relationship where the stress increases for initial strain and then the stress plateaus for further amounts of strain;
 (b) maintaining tension on the material of the parison while cooling the parison to a temperature in the range of from glass transition temperature for the material to about 15° C. below glass transition temperature;

(c) stretching at least a portion of the parison further while the material is in said cooler temperature range to at least an extent such that the material is on the verge of being strain hardened and thereby suppressing crystal growth by stretching the material at a reduced temperature yet conditioning the material for a subsequent blow molding operation.

14. The method as defined in claim 13, characterized by stretching said material into the strain hardening region during the performance of Step (c) as evidenced by the stress increasing subsequent to the plateau for additional amounts of strain.

15. The method as defined in claim 13, characterized by axially stretching the parison during the performance of Steps (a) and (c).

16. The method as defined in claim 13, characterized in Step (c) by stretching essentially only those portions of the parison which are destined to form heel and bottom portions of a container in a subsequent blow molding operation.

17. The method as defined in claim 13, including the further sequential steps subsequent to the performance of Step (c), of (d) heating the parison to a temperature in a range conducive to molecular orientation for the material, and (e) expanding the parison within a blow mold cavity to form a final article.

18. The method as defined in claim 17, wherein the thermoplastic material is polyethylene terephthalate characterized in Step (a) by stretching the material while at a temperature in the range of from about 75° C. to about 110° C. and characterized in Step (d) by heating the material to a temperature in the range of from about 75° C. to about 120° C.

* * * * *